United States Patent
Harfman Todorovic et al.

(10) Patent No.: US 12,424,843 B2
(45) Date of Patent: Sep. 23, 2025

(54) SYSTEMS AND METHODS TO PROTECT A MEMS RELAY SWITCH SYSTEM

(71) Applicants: Menlo Microsystems, Inc., Irvine, CA (US); Research Foundation of SUNY, Albany, NY (US)

(72) Inventors: Maja Harfman Todorovic, Northborough, MA (US); Mohammed Agamy, Niskayuna, NY (US)

(73) Assignees: Menlo Microsystems, Inc., Irvine, CA (US); Research Foundation of SUNY, Albany, NY (US)

( * ) Notice: Subject to any disclaimer, the term of this patent is extended or adjusted under 35 U.S.C. 154(b) by 0 days.

(21) Appl. No.: 19/101,053

(22) PCT Filed: Jul. 31, 2024

(86) PCT No.: PCT/US2024/040415
§ 371 (c)(1),
(2) Date: Feb. 4, 2025

(87) PCT Pub. No.: WO2025/029938
PCT Pub. Date: Feb. 6, 2025

(65) Prior Publication Data
US 2025/0260224 A1    Aug. 14, 2025

Related U.S. Application Data
(60) Provisional application No. 63/529,955, filed on Jul. 31, 2023.

(51) Int. Cl.
*H02H 3/08* (2006.01)
*H02H 7/22* (2006.01)
*H02H 9/02* (2006.01)

(52) U.S. Cl.
CPC ................................. *H02H 7/222* (2013.01)

(58) Field of Classification Search
CPC .... H02H 7/222; H01H 59/0009; H01H 59/00; H01H 1/0036; H01H 2009/544; H01H 9/541; H01H 9/548
See application file for complete search history.

(56) References Cited

U.S. PATENT DOCUMENTS

| | | | |
|---|---|---|---|
| 2005/0093645 A1* | 5/2005 | Watanabe | H03H 7/383 333/101 |
| 2008/0164961 A1 | 7/2008 | Premerlani et al. | |
| 2023/0420928 A1* | 12/2023 | Meng | H01H 33/596 |

FOREIGN PATENT DOCUMENTS

| | | |
|---|---|---|
| EP | 0534379 A2 | 3/1993 |
| WO | 2017069861 A1 | 4/2017 |
| WO | 2025/029938 A1 | 2/2025 |

OTHER PUBLICATIONS

International Search Report and Written Opinion dated Oct. 22, 2024 for International Application No. PCT/US2024/040415.

* cited by examiner

*Primary Examiner* — Sean Kayes
*Assistant Examiner* — Lucy M Thomas
(74) *Attorney, Agent, or Firm* — Hamilton, Brook, Smith & Reynolds, P.C.

(57) ABSTRACT

A system for protecting a MEMS relay switch system that controls electric current to a load includes a parallel resonant circuit in series with the MEMS relay switch system. The parallel resonant circuit includes an auxiliary switch in series with a capacitor configured to be pre-charged by a voltage source, and an inductor in parallel with the auxiliary switch and the capacitor. The inductor is in series with the MEMS relay switch system. A method includes receiving a signal, activating an auxiliary switch, determining if the received signal is a turn OFF or a turn ON signal, and depending on the received signal, setting a time delay within (Continued)

a resonant half cycle of a parallel resonant pulse circuit, turning off the auxiliary switch, and pre-charging a capacitor of the parallel resonant pulse circuit.

20 Claims, 18 Drawing Sheets

SYSTEMS AND METHODS TO PROTECT A MEMS RELAY SWITCH SYSTEM

CROSS REFERENCE TO RELATED APPLICATION

This application is the U.S. National Stage of International Application No. PCT/US2024/040415, filed Jul. 31, 2024, which designates the U.S., published in English, and claims the benefit of U.S. Provisional Application 63/529,955, filed Jul. 31, 2023. The entire teachings of the above applications are incorporated herein by reference.

BACKGROUND

1. Technical Field

The present disclosure relates to systems and methods to protect microelectromechanical system (MEMS) relays for ON-OFF switching of electrical current in a current path.

2. Background Art

Relays selectively control the flow of current between circuits to provide electrical isolation between a control circuit and one or more controlled circuits. Relays are electrically operated switches and may be electromechanical relays or solid-state relays (SSR) depending upon the system and environment in which the relay is implemented.

Electromechanical relays may be used to control high power devices and may include a movable conductive cantilever beam and an electromagnetic coil. When activated, the electromagnetic coil exerts a magnetic force on the beam that causes the beam to be pulled toward the coil, down onto an electrical contact, closing the relay. The beam itself may act as the second contact and a wire, passing current through the relay. Alternatively, the beam may span two contacts, passing current only through a small portion of the beam. Electromechanical relays may withstand momentary overload and have a low "on" state resistance ($R_{on}$). However, electromechanical relays may be large and require the use of a large force to activate the switching mechanism. Electromechanical relays may operate at relatively slow speeds and, when the beam and contacts of the relay are physically separated, an arc may form between the beam and the contacts. The arc allows current to flow through the relay until the current in the circuit ceases, which may damage the contacts.

A solid-state relay (SSR) switches ON or OFF when a small external voltage is applied across its control terminals. SSRs include a sensor which responds to an appropriate input (control signal), a solid-state electronic switching device (e.g., thyristor, transistor, etc.) which switches power to the load circuitry, and a coupling mechanism to enable the control signal to activate the switch without mechanical parts. SSRs may have fast switching speeds compared with electromechanical relays and have no physical contacts to wear out (i.e., no moving parts), However, SSRs have a lower ability to withstand momentary overload compared with electromechanical contacts and have a higher on resistance ($R_{on}$) than electromechanical relays. As SSR switches do not include a physical gap between contacts when they are switched OFF they experience leakage current when nominally non-conducting. SSR switches operating in a conducting state experience a voltage drop due to internal resistances. The voltage drop and leakage current contribute to power dissipation and the generation of excess heat under normal operating circumstances, which may be detrimental to switch performance and life and/or necessitate the use of large, expensive heat sinks when passing high current loads.

MEMS relays may be used as an alternative to SSRs with most of the benefits of conventional electromechanical relays but sized to fit the needs of modern electronic systems. However, prior MEMS relays are overly complex and may not adequately limit voltage across the movable switch(es), such that operation of the MEMS relay may not be reliable. To use MEMS relays with higher speed circuitry a relatively high-level signal may be used to force the connection with the contact in the shortest amount of time. The drive signal may rise at a very rapid rate to a maximum voltage to electrostatically urge a MEMS cantilever beam toward the stationary contact. This rapid rate may cause the arm to physically bounce off the contact and oscillate before making a stationary contact. Providing a signal that rises slower to attempt to reduce or eliminate the bouncing problem reduces the speed of closing the switch.

BRIEF DESCRIPTION

In accordance with one example or aspect, a system may include a system for protecting a MEMS relay switch system that controls electric current to a load. The system may comprise a parallel resonant circuit in series with the MEMS relay switch system. The parallel resonant circuit may comprise an auxiliary bidirectional switch in series with a capacitor configured to be pre-charged by a voltage source, and an inductor in parallel with the auxiliary bidirectional switch and the capacitor. The inductor is in series with the MEMS relay switch system.

In accordance with one example or aspect, a method for protecting a MEMS relay switch system that controls electric current to a load may comprise receiving a turn OFF signal and activating an auxiliary bidirectional switch of a parallel resonant circuit in series with the load. The parallel resonant circuit may comprise the auxiliary bidirectional switch in series with a capacitor configured to be pre-charged by a voltage source, and an inductor in parallel with the auxiliary bidirectional switch and the capacitor, the inductor being in series with the load. The method may further comprise setting a time delay within a resonant half cycle of the parallel resonant circuit for the electric current to cross zero within a predefined electric current band, turning OFF the MEMS relay switch system, and turning OFF the auxiliary bidirectional switch.

In accordance with one example or aspect, a method for protecting a MEMS relay switch system that controls electric current to a load may comprise receiving a turn ON signal and activating an auxiliary bidirectional switch of a parallel resonant circuit in series with the load. The parallel resonant circuit may comprise the auxiliary bidirectional switch in series with a capacitor configured to be pre-charged by a voltage source, and an inductor in parallel with the auxiliary bidirectional switch and the capacitor, the inductor being in series with the load. The method may further comprise setting a time delay within a resonant half cycle of the parallel resonant circuit for a voltage of the MEMS relay switch system to go negative and recover through a zero voltage within a predefined voltage band, turning ON the MEMS relay switch system, and turning OFF the auxiliary bidirectional switch.

Throughout the description, where systems or compositions are described as having, including, or comprising specific components, or where methods are described as having, including, or comprising specific acts or steps, it is contemplated that, additionally, there are systems or compositions according to the disclosed embodiments that consist essentially of, or consist of, the recited components, and that there are methods according to the disclosed examples that consist essentially of, or consist of, the recited acts or steps.

The following description is for illustration and exemplification of the disclosure only and is not intended to limit the disclosed examples to the specific examples described.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
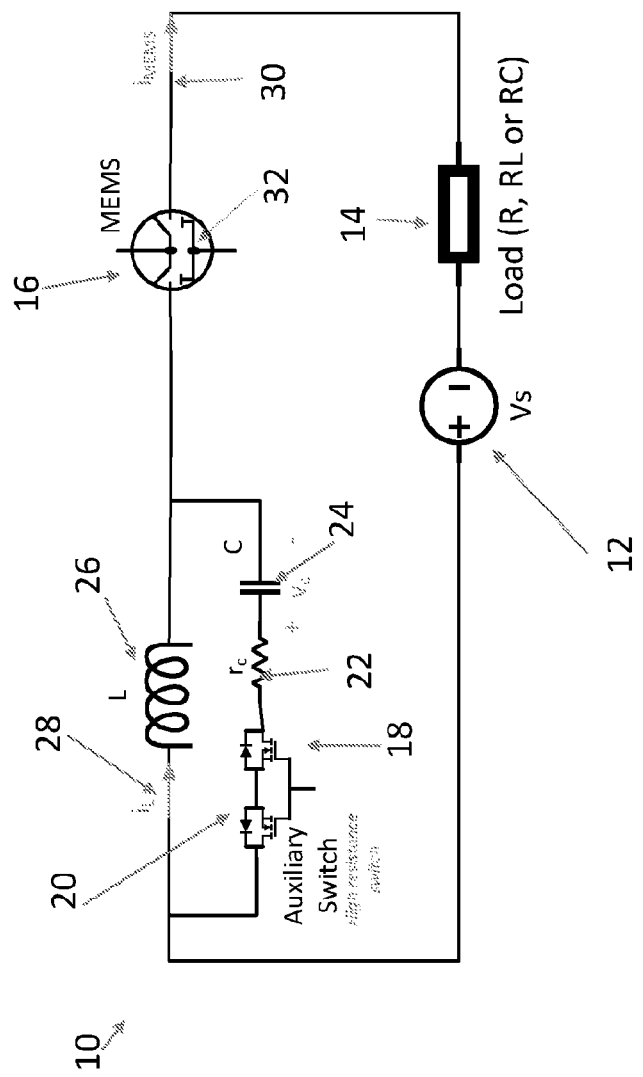
FIG. 1 schematically illustrates a system to protect a MEMS relay switch system according to one example.

Examples of the subject matter described herein relate to systems and methods for protecting a MEMS relay switch system. Microelectromechanical switches (MEMS) are an emerging technology for power relays as they provide several benefits such as high-power density, microsecond scale transition times, galvanic isolation and very low on state resistance ($R_{on}$). However, to maintain high switch reliability, arcing between contacts during switching transitions must be prevented to avoid degradation of the physical integrity of the beams of the MEMS. One approach to soft switch the MEMS is to use a bypass semiconductor switch that is only activated before any switching transition of the MEMS. As the current capability of MEMS is increased and the ON state resistance drops, the bypass switch becomes progressively less practical as the size of the semiconductor switch will be prohibitively large otherwise it will not be possible to divert sufficient current into the bypass path and the MEMS will be hot switched (i.e., switched when there is a voltage applied across the MEMS and/or a current flows through the MEMS). The systems disclosed herein provide a soft switching auxiliary circuit that provides a high series impedance path to the current prior to switching rather than a low impedance parallel path. The systems can provide zero voltage turn ON and zero current turn OFF of MEMS and can be readily adapted to the higher power ratings of MEMS.

Pulse circuits are used to protect the microswitches of a MEMS switch relay system from arcing during opening and closing. The pulse circuits described herein may include a parallel resonant circuit including a pre-charged capacitor, a bidirectional auxiliary switch in series with the pre-charged capacitor, and an inductor or inductance in series with the MEMS switch. The inductor is parallel to the pre-charged capacitor and the bidirectional auxiliary switch. Without the pulse circuits, there would always be a single switch that would attempt to turn the power OFF or ON, because the microswitches of the MEMS relay switch system cannot be made to all open and close exactly synchronized. This issue is addressed by the opening and closing with a parallel resonant circuit. The same circuit configuration is used for both opening and closing. The parallel resonant circuit provides a very high impedance in series with the MEMS relay switch system when activated and this drives the load current to zero while the microswitches are opening without arcing. The MEMS voltage is driven to zero by the parallel resonant circuit during the turn ON pulse also preventing arcing. The pulses can be rather narrow, because of the high speed of the microswitches. After each use of the parallel resonant circuit the capacitors are recharged to provide trip-free capability if there is a fault.

Providing a bypass circuit that will take majority of the load current during transitions operates to protect the MEMS switches. The current trend of reduction of the ON resistance of the MEMS switches made it difficult to find the adequate switch (low enough $R_{on}$) for a bypass circuit.

Some other pulse circuits (serial resonance) provide a parallel path for current to flow while the MEMS are opening or closing but suffer from diode voltage drop across the switches that cannot be reduced. This will also lead to unavoidable leakage when the MEMS switch is in the OFF stage.

The disclosed pulse (parallel resonant) circuit when engaged during the turn OFF process presents very high impedance in series with the load current and drives the load current to zero. This provides a window to open the MEMS switch without arcing during that period. The same circuit during the turn ON process drives the MEMS switch voltage to zero and allows closing of the MEMS switch without arcing. Component values of capacitance (C), inductance (L), voltage (V), charge, and control delays may be controlled, for example through knobs, that may be turned in to get adequate timing when to open or close.

Referring to FIG. 1, a system 10 for protecting a MEMS relay switch system 16 may include a voltage source or supply 12 and a load 14. The system 10 may further include a pulse parallel resonant circuit 18. The pulse parallel resonant circuit 18 is placed in series with the MEMS relay switch system 16. The pulse parallel resonant circuit 18 may include a capacitor 24 in series with an auxiliary switch 20. The auxiliary switch 20 may be a high resistance switch. The auxiliary switch may be a bidirectional switch. The auxiliary switch may be a unidirectional switch with reverse blocking capability, for example a controlled switch (e.g., MOSFET, IGBT, JFET, thyristor) in series with a diode. The switch may be, for example, a solid-state switch. The solid-state switch may include, for example, a MOSFET, an IGBT, and/or a JFET. The auxiliary switch may comprise any four-quadrant switch combination that conducts current in both directions and blocks voltage in both directions. The auxiliary switch may comprise two switches (e.g., MOSFET, IGBT, JFET) in back-to-back configuration. The auxiliary switch may comprise two thyristors in anti-parallel configuration.

A resistor 22 may be in series with the auxiliary switch 18 and the capacitor 24. The capacitor 24 may be pre-charged for operation of the system 10. The capacitor 24 may be pre-charged to a higher voltage than the peak voltage of the voltage source 12. For example, the capacitor 24 may be charged to a voltage that is 10% to 30% higher than the peak voltage of the voltage source 12. According to another example, the capacitor may be charged to a voltage that is 5% to 10% higher than the peak voltage of the voltage source. The parallel resonant circuit 18 may include an inductor or inductance 26. The inductor 26 may be in parallel with the auxiliary switch 20, the capacitor 24, and/or the resistor 22 and in series with the MEMS relay switch system 16. The auxiliary switch 20 is closed only prior to a mode change, either before turn ON or before turn OFF action. During the time when the MEMS relay switch system 16 is inactive (OFF position) there is no path for current 30 ($i_{MEMS}$) to flow, resulting in zero leakage current.

The MEMS switches of the MEMS relay switch system are electrostatically operated by a control voltage that is applied between the gate and the middle point (MP) 32 of each of the MEMS switches. The polarity of the applied voltage is not important, and the electrostatic closing voltage is proportional to the square of the gate to MP voltage. Normally, except for capacitive charging current, no current flows between gate and MP. When sufficient gate to MP voltage is applied, the MEMS switch closes, providing a low resistance conductive path between an IN and an OUT terminal.

If the MEMS switches of the MEMS relay switch system 16 are closed and conducting load current and a turn OFF transition is required, first a gate pulse is applied to the bidirectional auxiliary switch 20 in the branch of the capacitor 24 to create a parallel resonant circuit, which engages the capacitor 24 to provide a path to divert the load current 30 and drive it to zero value. This happens because of exchange of energy between the capacitor 24 and the inductor 26 that lasts only one half of the resonant period, $\omega=1/\sqrt{LC}$. A VLC current sensor may monitor the MEMS current and may trigger a control circuit after its current is less than a threshold current and send the gate signal to the MEMS switches of the MEMS relay switch system 16 to open. This is accomplished by opening with the zero current and therefore no arcing would occur between the terminals of the MEMS switches of the MEMS relay switch system 16. The pulse parallel resonant circuit acts like a high impedance during that $\omega/2$ period providing a zero current condition to open a circuit. The dynamics of the circuit when the auxiliary switch is activated are given by:

$$\begin{bmatrix} i_L \\ \dot{v}_c \end{bmatrix} = \begin{bmatrix} -r_c/L & -r_c/(LR_{load}) \\ -1/C & -1/(CR_{load}) \end{bmatrix} \begin{bmatrix} i_L \\ v_c \end{bmatrix} + \begin{bmatrix} r_c/(LR_{load}) \\ 1/(CR_{load}) \end{bmatrix} V_s. \quad (1)$$

Initial current ($i_L$) 28=Load current ($V_s/R_{load}$).
The output parameter of interest at turn OFF is the MEMS current where, $$I_{MEMS} = i_L + C\frac{dv_c}{dt}. \quad (2)$$

Figure 3:
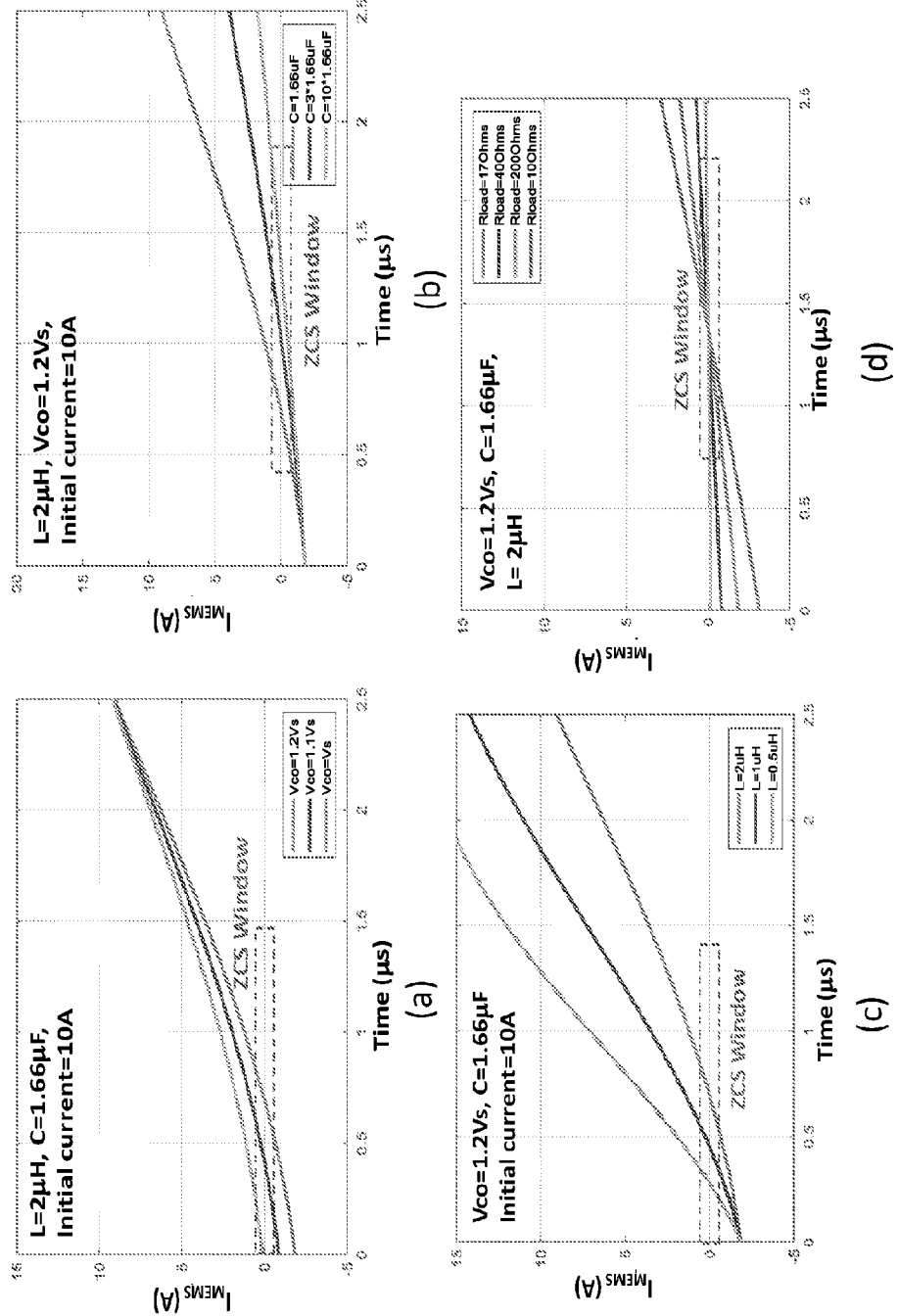
FIGS. 3(a)-3(d) schematically illustrate a parametric analysis of a switching circuit according to one example in turn OFF transition.

Equations (1) and (2) can be used to analyze the impact of resonant L and C and the capacitor pre-charge voltage on the switching transition times and the zero/low current switching (ZCS) window. Referring to FIGS. 3(a)-3(d), a parametric analysis of the soft switching circuit in turn OFF transition is shown. FIG. 3(a) shows the effect of the pre-charge voltage. FIG. 3(b) shows the effect of the capacitor value. FIG. 3(c) shows the effect of the inductor value. FIG. 3(d) shows the effect of the load current. A design trade-off may be made between component size and the acceptable response time. As an example, the MEMS may be turned OFF in the region where current is close to zero (e.g. to maintain turn of at $|I_{MEMS}|\leq0.2$ A with ~1 µs response time, values of L=2 µH, C=1.6 µF and a pre-charge voltage of 1.2× the input voltage are provided. Longer response time requires larger passives and vice-versa.

The turn ON process, similar to the turn OFF process, starts with closing the auxiliary switch 18 in series with the capacitor 24 to create a zero-voltage condition for the MEMS switches of the MEMS relay switch system 16 to close without arcing. Voltage across the MEMS relay switch system 16 is equal to the source voltage (Vs) minus that pre-charged voltage across the capacitor (Vc) so initially that voltage would drop to a negative value and then start rising resonantly to cross the zero point. A voltage sensor across the MEMS switch would engage the control circuit when that voltage is less than a threshold value to generate the gate signal to close the MEMS switch. The dynamics of the circuit at turn ON are governed by a third order model that includes the voltage across the open MEMS capacitance ($C_{MEMS}$) as a third state. This third state was neglected in the turn OFF process as it was bypassed by the conducting MEMS. The circuit dynamics are thus given by:

$$\begin{bmatrix} i_L \\ \dot{v}_c \\ \dot{v}_{MEMS} \end{bmatrix} = \begin{bmatrix} -r_c/L & 1/L(1-r_c/R_{load}) & -r_c/(LR_{load}) \\ -1/C & -1/CR_{load} & -1/CR_{load} \\ 0 & -1/C_{MEMS}R_{load} & -1/C_{MEMS}R_{load} \end{bmatrix} \quad (3)$$

$$\begin{bmatrix} i_L \\ v_c \\ v_{MEMS} \end{bmatrix} + \begin{bmatrix} r_c/(LR_{load}) \\ 1/CR_{load} \\ 1/C_{MEMS}R_{load} \end{bmatrix} V_s.$$

Figure 4:
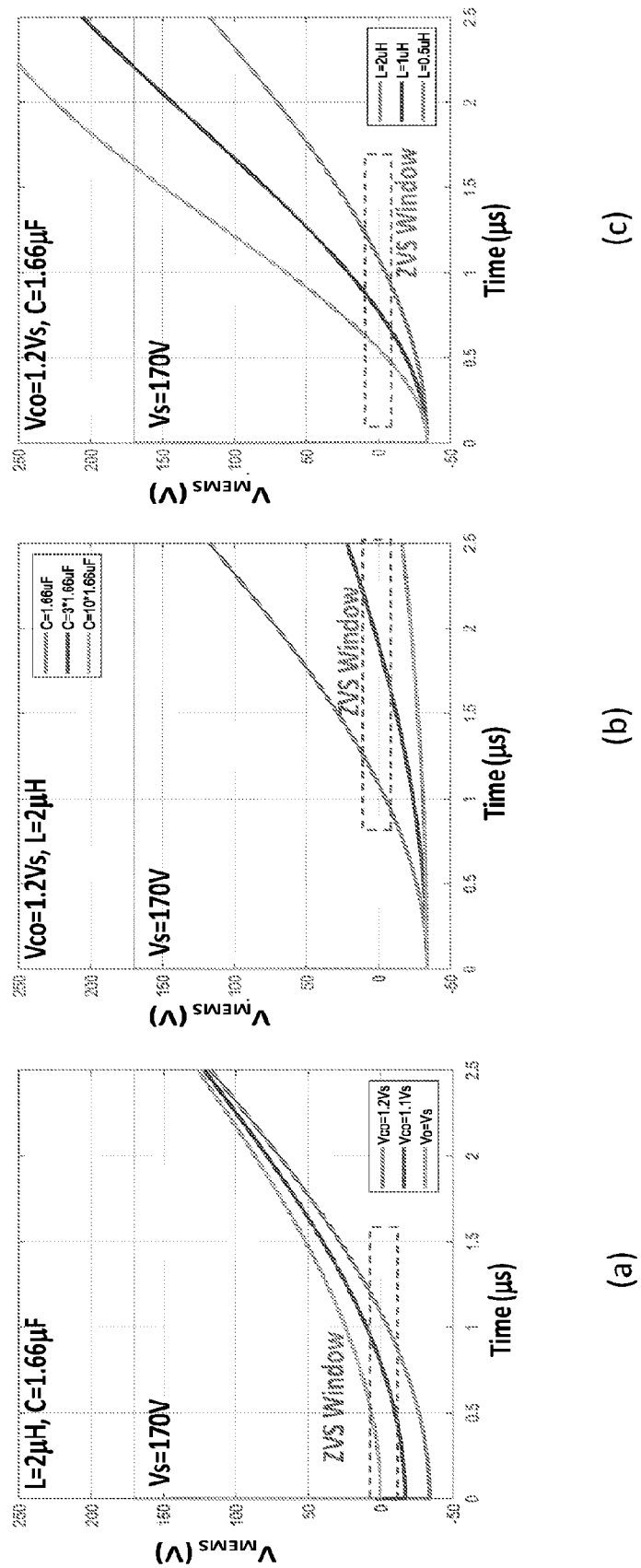
FIGS. 4(a)-4(c) schematically illustrate a parametric analysis of a switching circuit according to one example in turn ON transition.

Solving the equations in (3), values of L, C and pre-charge voltage of the resonant capacitor 24 can be determined to achieve zero voltage switching (ZVS) at turn ON. Referring to FIGS. 4(a)-4(c), a parametric analysis of the soft switching circuit in turn ON transition is shown. FIG. 4(a) shows the effect of the pre-charge voltage. FIG. 4(b) shows the effect of the capacitor value. FIG. 4(c) shows the effect of the inductor value. A trade-off between passive component sizes and duration of the ZVS window is made to determine the values of L, C and pre-charge voltage. As an example, to maintain turn of at $|V_{MEMS}| \leq 5V$ with ~1 µs response time, values of L=2 µH, C=1.6 µF and a pre-charge voltage of 1.2× the input voltage is needed.

Figure 5:
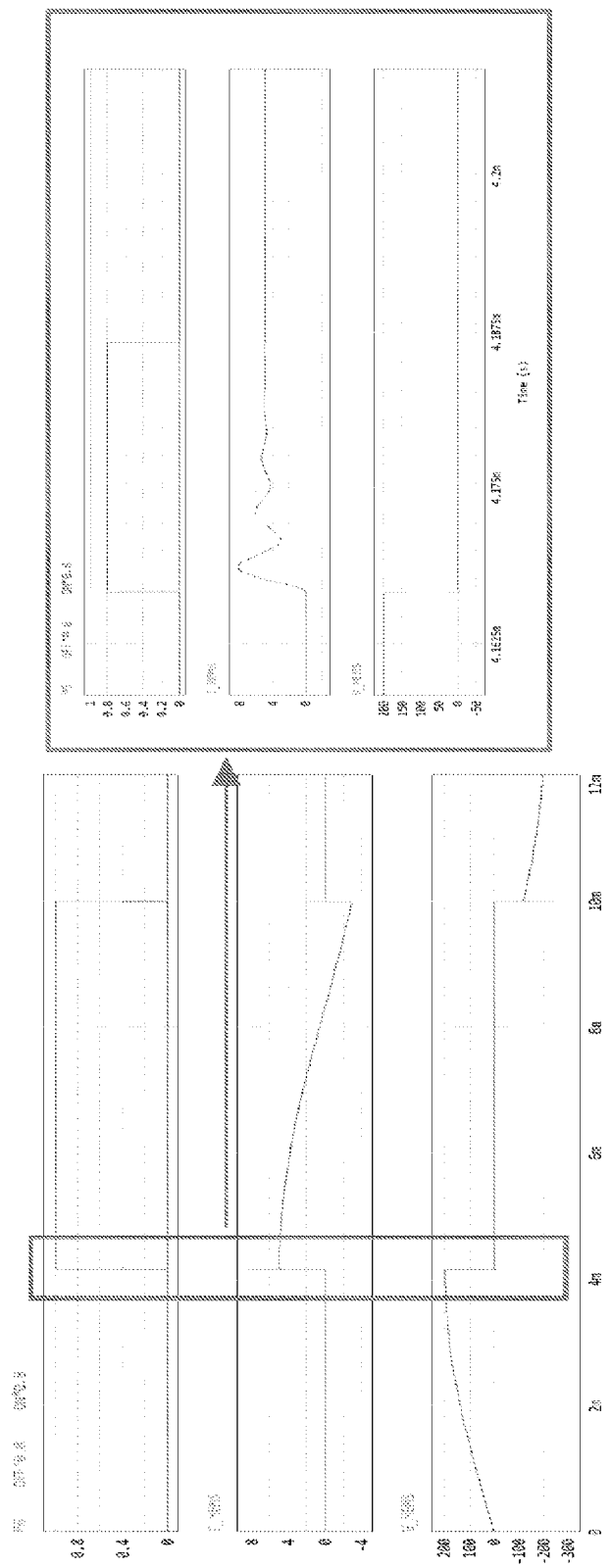
FIG. 5 schematically illustrates soft switching transitions for AC input voltage according to one example.

The proposed circuit works for both DC and AC cases. For DC case the auxiliary resonant branch switch may be formed using a MOSFET and a series diode while in the AC case two MOSFET switches in back-to-back configuration may be used to form a four-quadrant switch. In the case of AC circuit turning ON may be done by either i) pre-charging of the capacitor matching the voltage of the source, ii) variable delay in order to accomplish zero voltage transition or iii) setting the pre-charge voltage according to the peak voltage in each half cycle. According to one example, the simplest realization of ZVS turn ON would be to wait for zero crossing of the line voltage after receiving an ON command leading to a worst case 8 ms delay in 60 Hz circuits. Referring to FIG. 5, an example of soft switching transitions for AC input voltage is shown.

Figure 2:
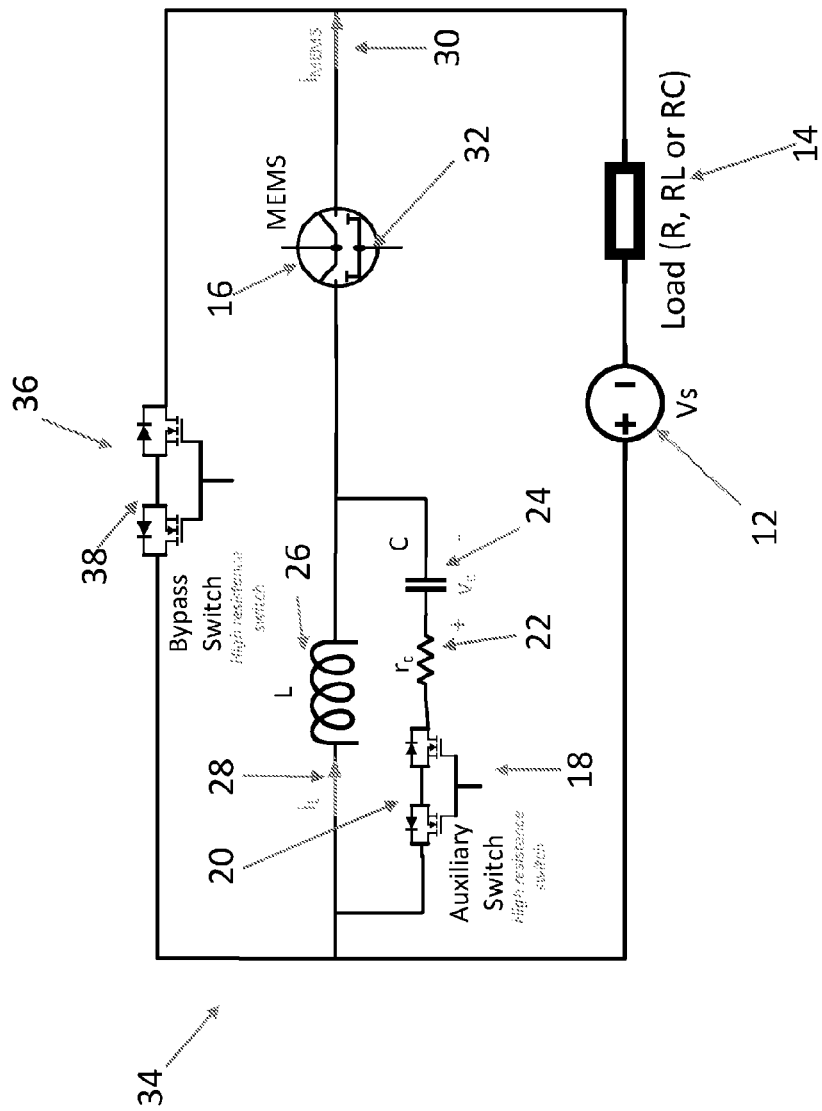
FIG. 2 schematically illustrates a system to protect a MEMS relay switch system according to one example.

Referring to FIG. 2, a system 36 for protecting a MEMS relay switch system 16 may include a voltage source or supply 12 and a load 14. The structure of the system 36 is similar to the system 10 shown and described in FIG. 1, wherein like reference numerals and characters indicate like elements. The system 34 may include a bypass switch 36 in parallel with the pulse parallel resonant switch 18. The bypass switch 36 may include a second auxiliary switch 38, similar to the example of the system of FIG. 1. In the system 34 of FIG. 2, the ON transition may be performed with the bypass switch 36 when the system does not include a gate driver that includes the capability to eliminate mechanical bouncing during the turn ON transition. The bypass switch 36 also achieves zero current turn OFF transition in the use of the system with highly inductive loads.

Figure 6:
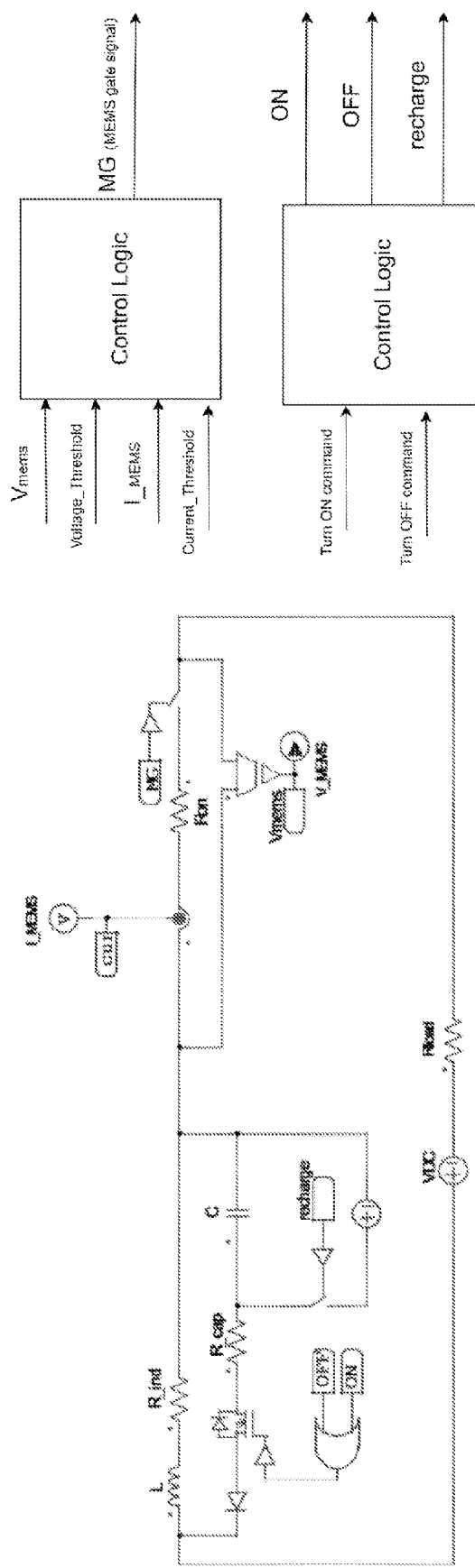
FIG. 6 schematically illustrates a system to protect a MEMS relay switch system operating with DC current according to one example.
Figure 7:
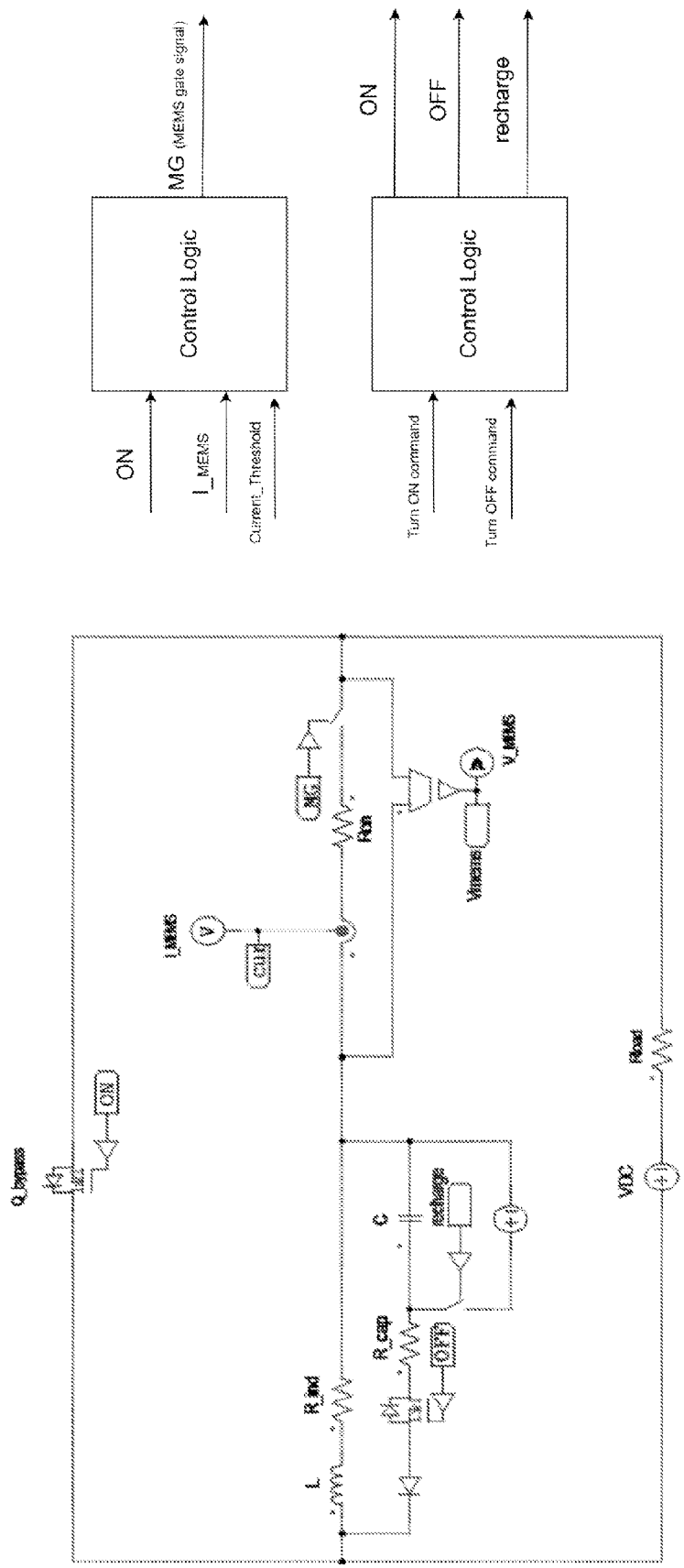
FIG. 7 schematically illustrates a system to protect a MEMS relay switch system operating with DC current according to one example.
Figure 8:
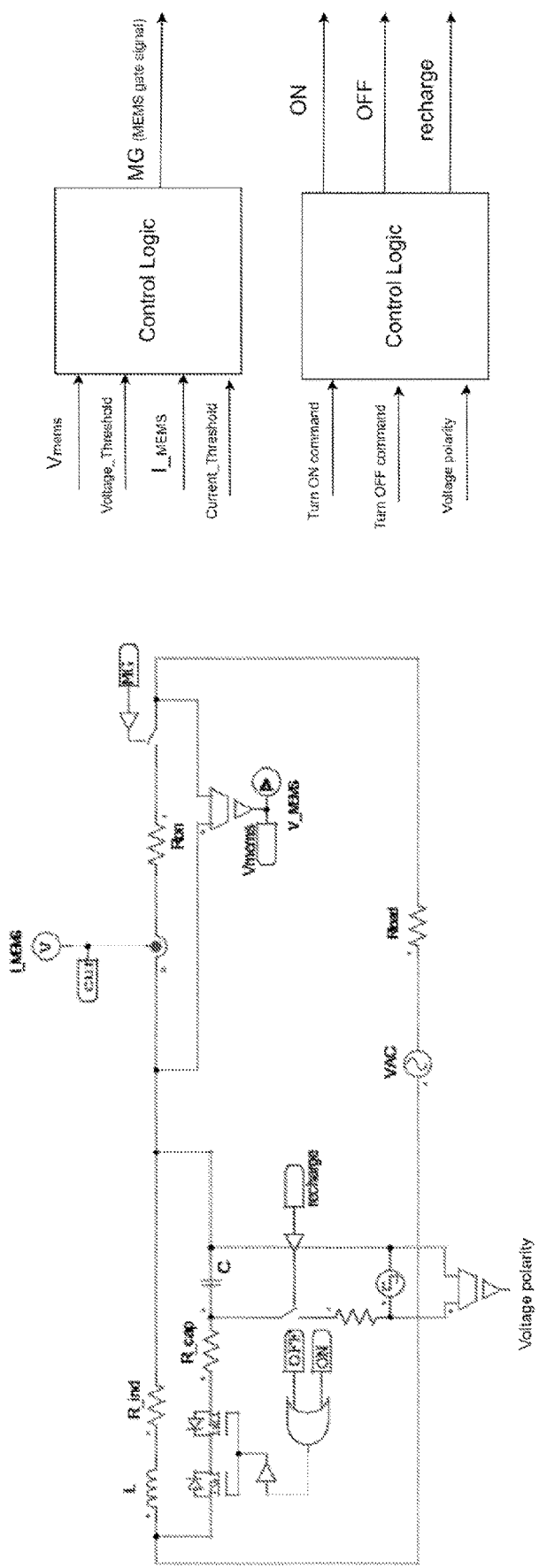
FIG. 8 schematically illustrates a system to protect a MEMS relay switch system operating with AC current according to one example.
Figure 9:
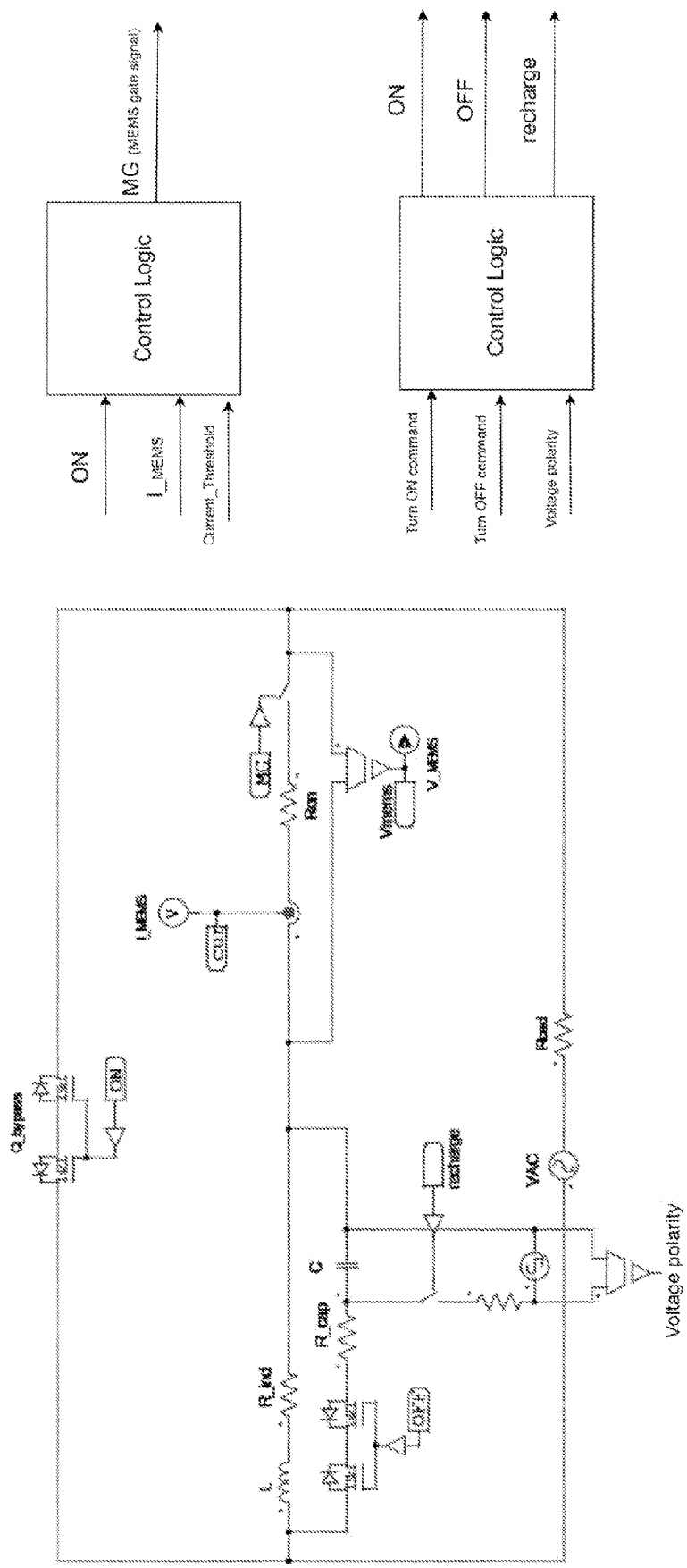
FIG. 9 schematically illustrates a system to protect a MEMS relay switch system operating with AC current according to one example.
Figure 10:
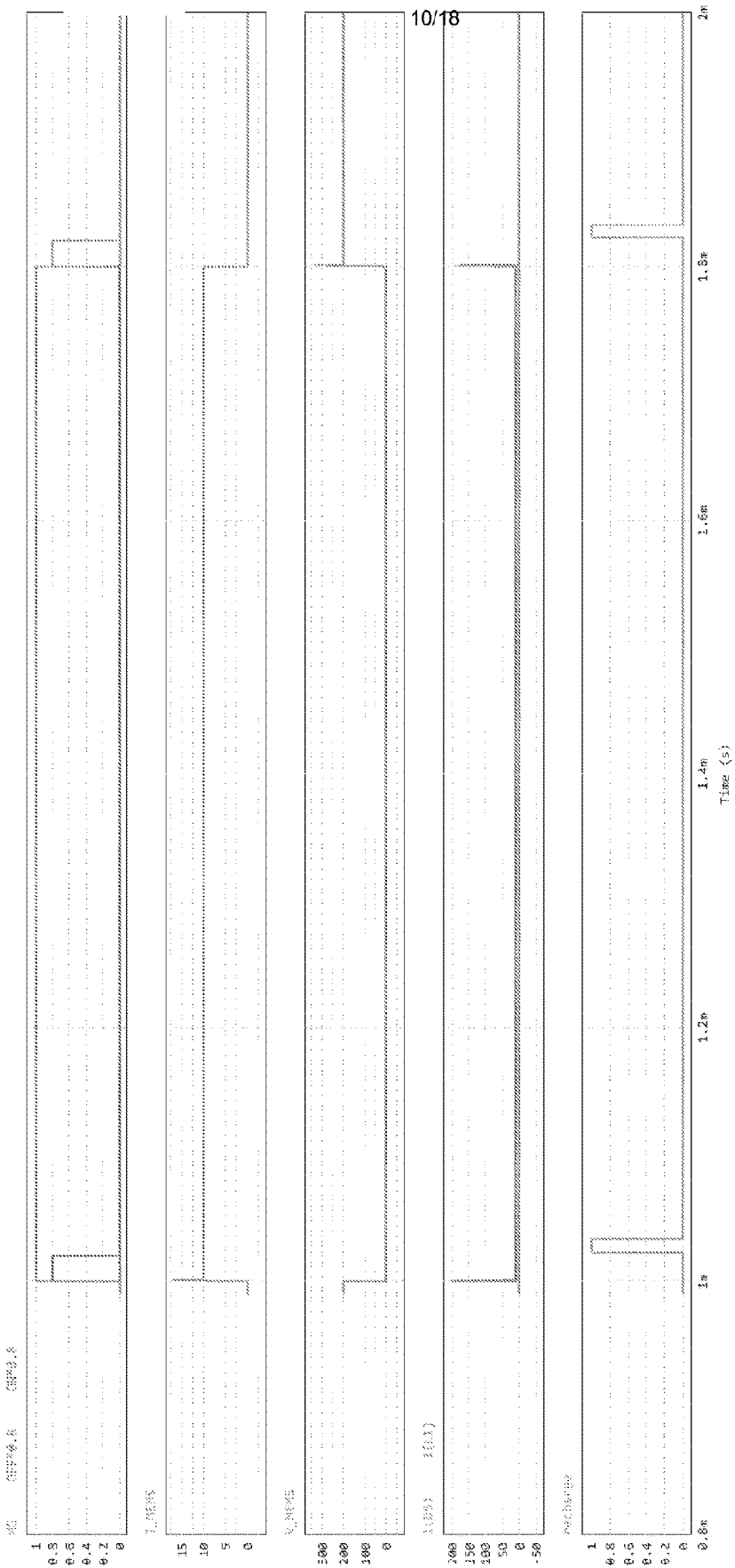
FIGS. 10-14 schematically illustrate operation of a system with DC current according to one example, wherein FIG. 11 schematically illustrates operation of a system with DC current during an ON transition of the MEMS relay switch system, FIG. 12 schematically illustrates operation of a system with DC current during an ON transition of the MEMS relay switch system, FIG. 13 schematically illustrates operation of a system with DC current during an OFF transition of the MEMS relay switch system, and FIG. 14 schematically illustrates operation of a system with DC current during an OFF transition of the MEMS relay switch system.

The example systems may be implemented in a variety of ways. FIGS. 6-9 schematically illustrate some examples. Referring to FIG. 6, a system may be implemented as shown for use with DC current. As shown in FIG. 6, the system may not include a bypass switch. Referring to FIG. 7, a system may be implemented as shown for use with DC current may include a bypass switch. Referring to FIG. 8, a system may be implemented as shown for use with AC current. As shown in FIG. 8, the system may not include a bypass switch. Referring to FIG. 9, a system may be implemented as shown for use with AC current. As shown in FIG. 9, the system may include a bypass switch.

The operation of the various examples may be as shown according to FIGS. 10-17.

Figure 11:
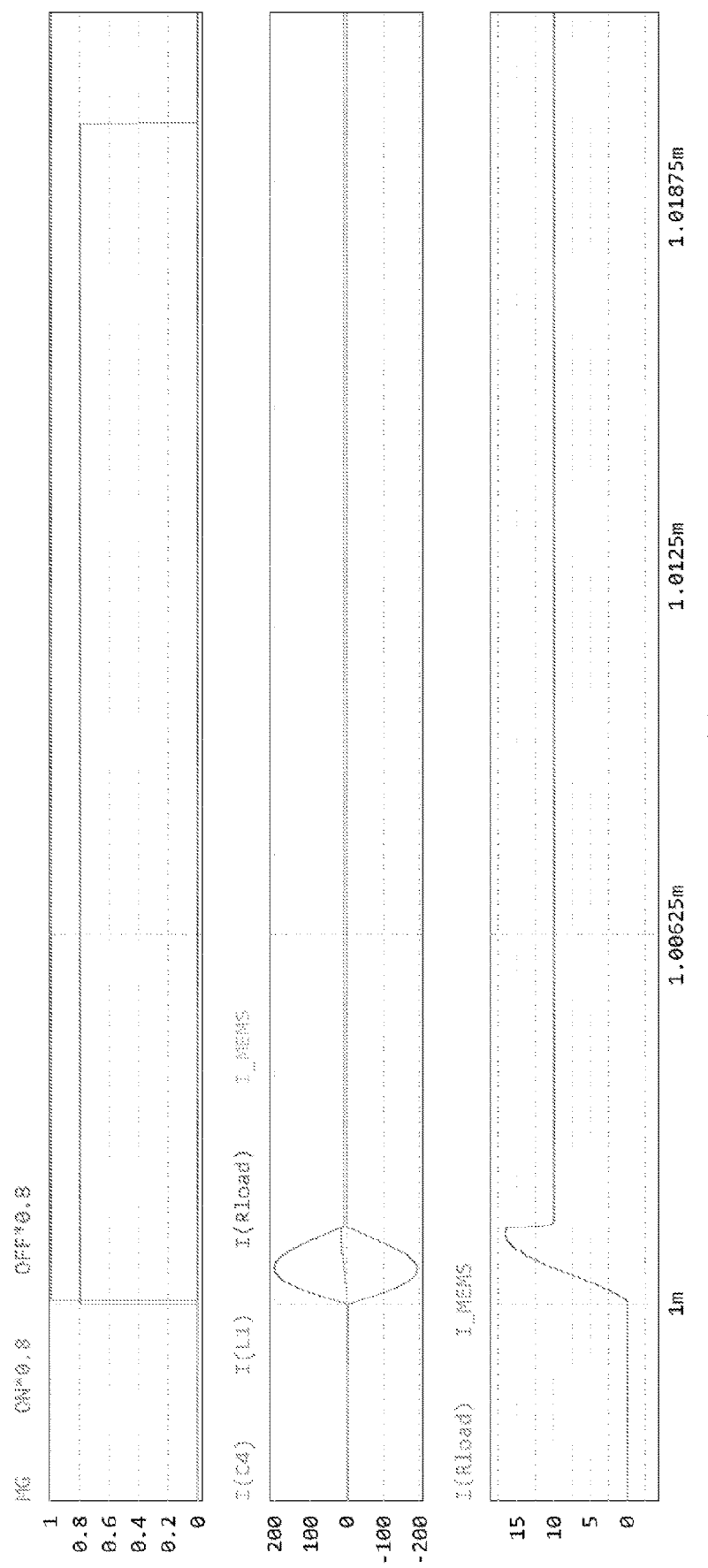
Figure 12:
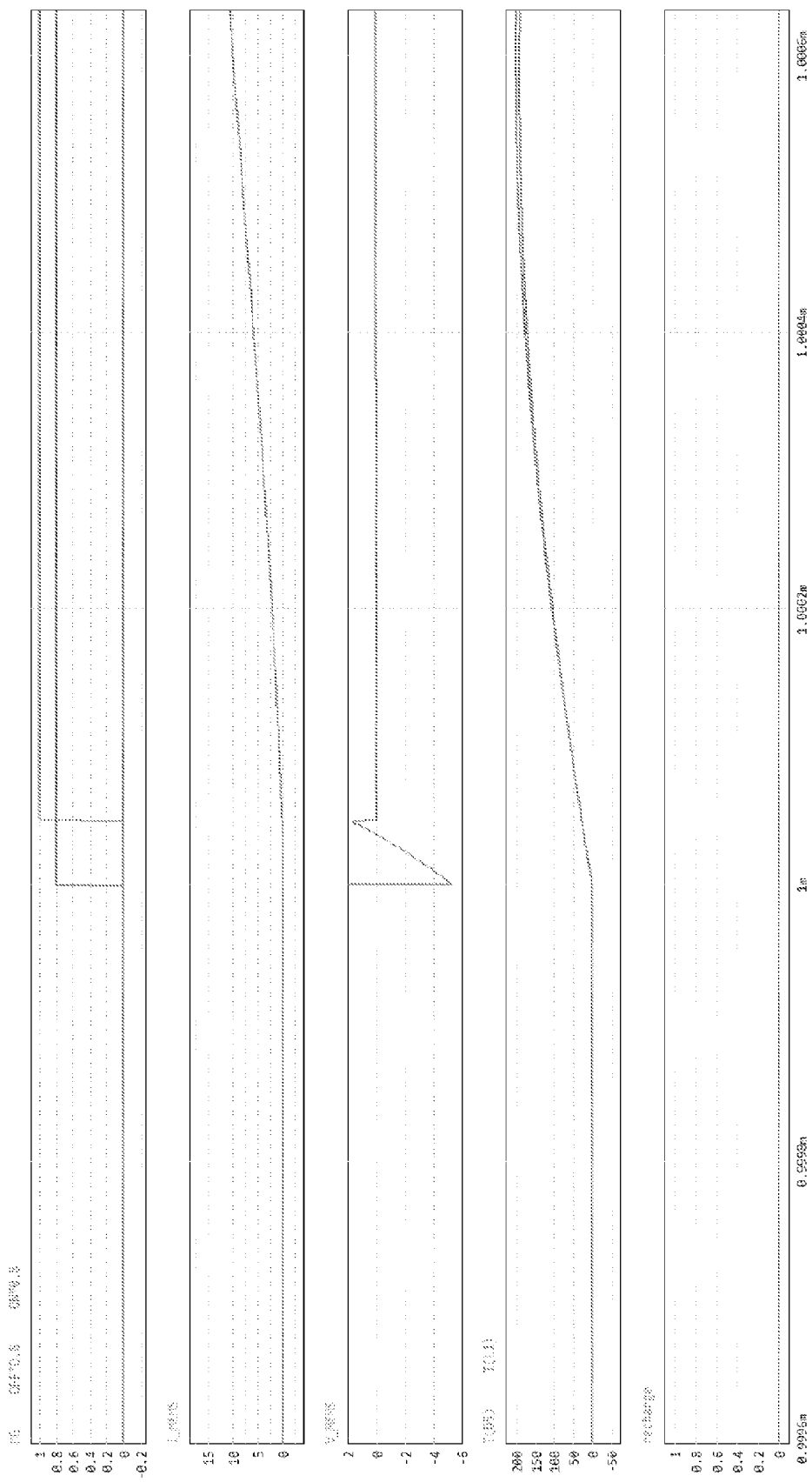
Figure 13:
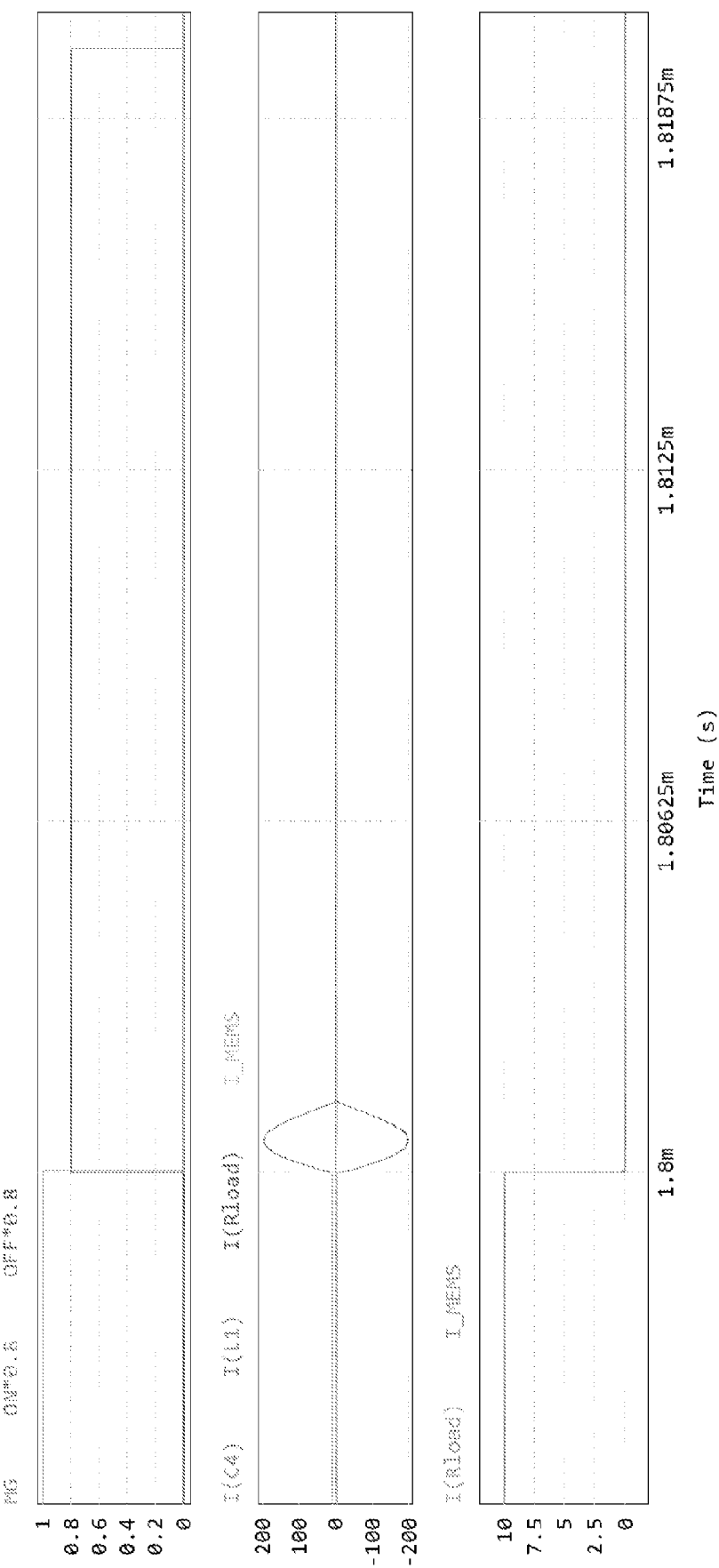
Figure 14:
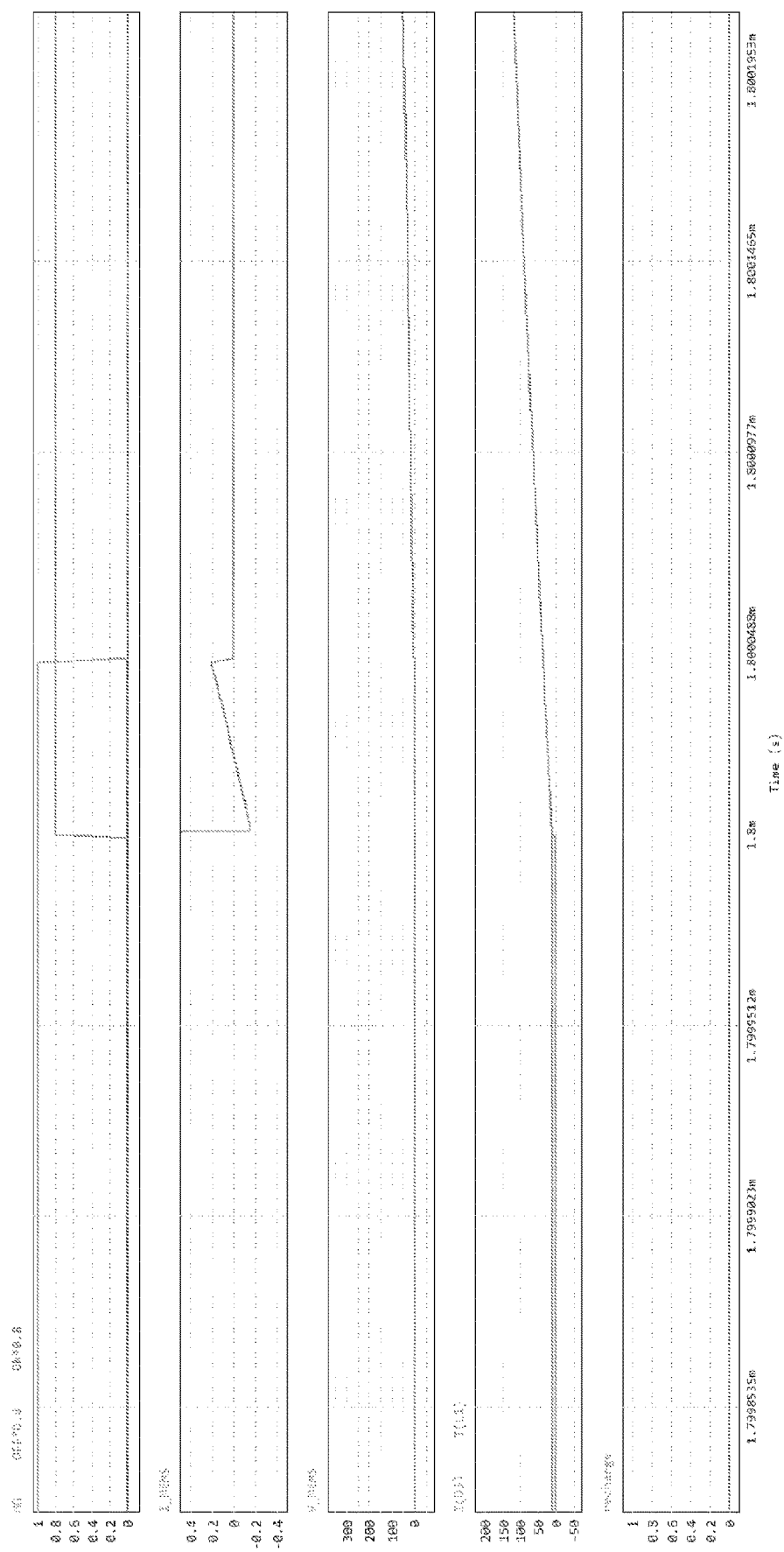

Referring to FIGS. 10-14, the parameters of a system operating with a 200V DC voltage source and a 10 A current rating are schematically illustrated. Referring to FIG. 11, the current flows through the system during the ON transition are shown. Referring to FIG. 12, the MEMS voltages during the ON transition are shown. Referring to FIG. 13, the current flows through the system during the OFF transition are shown. Referring to FIG. 14, the MEMS voltages during the OFF transition are shown.

Figure 15:
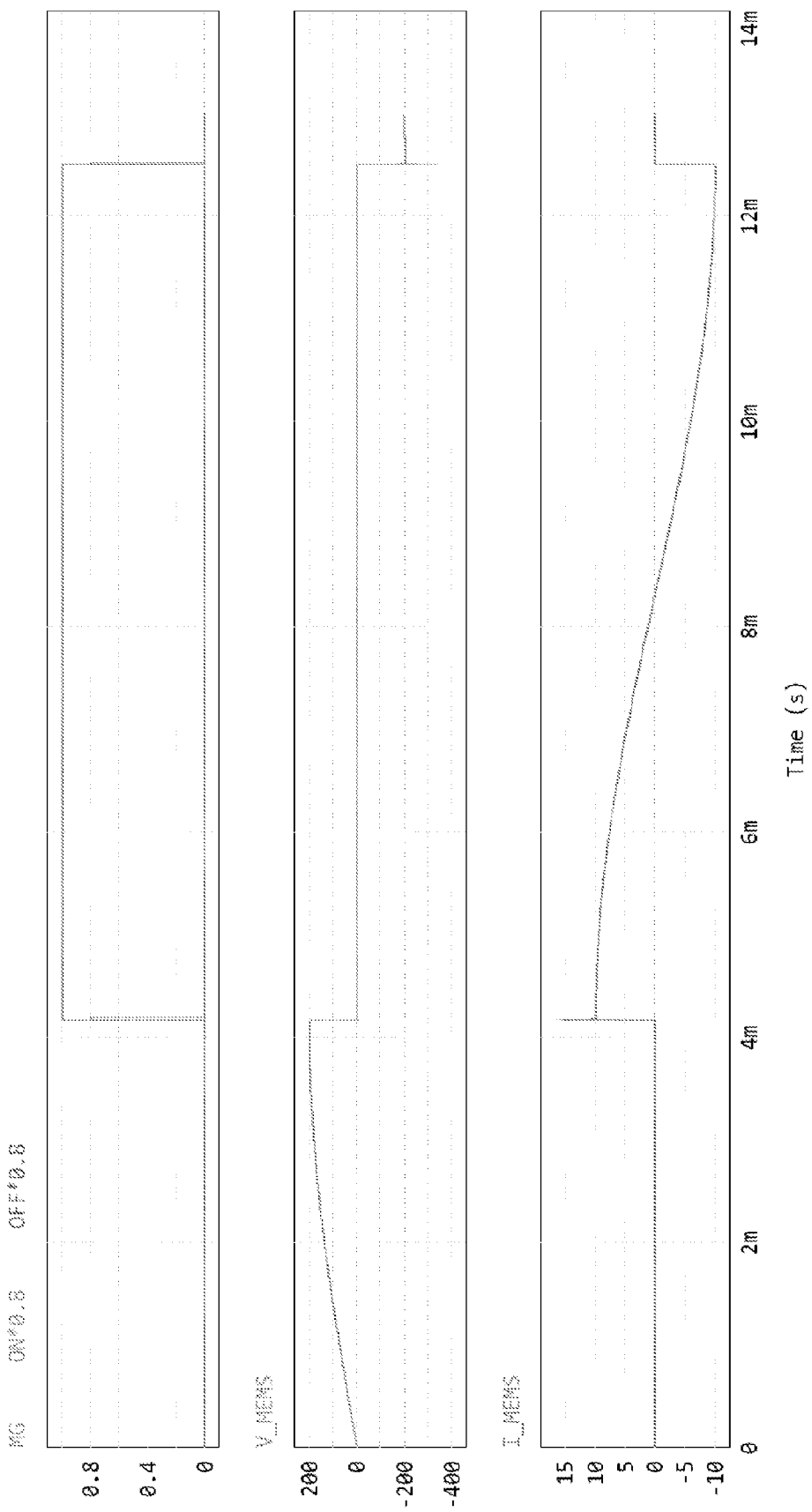
FIGS. 15-17 schematically illustrate operation of a system with AC current, wherein FIG. 16 schematically illustrates operation of a system with AC current during an ON transition of the MEMS relay switch system and FIG. 17 schematically illustrates operation of a system with AC current during an OFF transition of the MEMS relay switch system.
Figure 16:
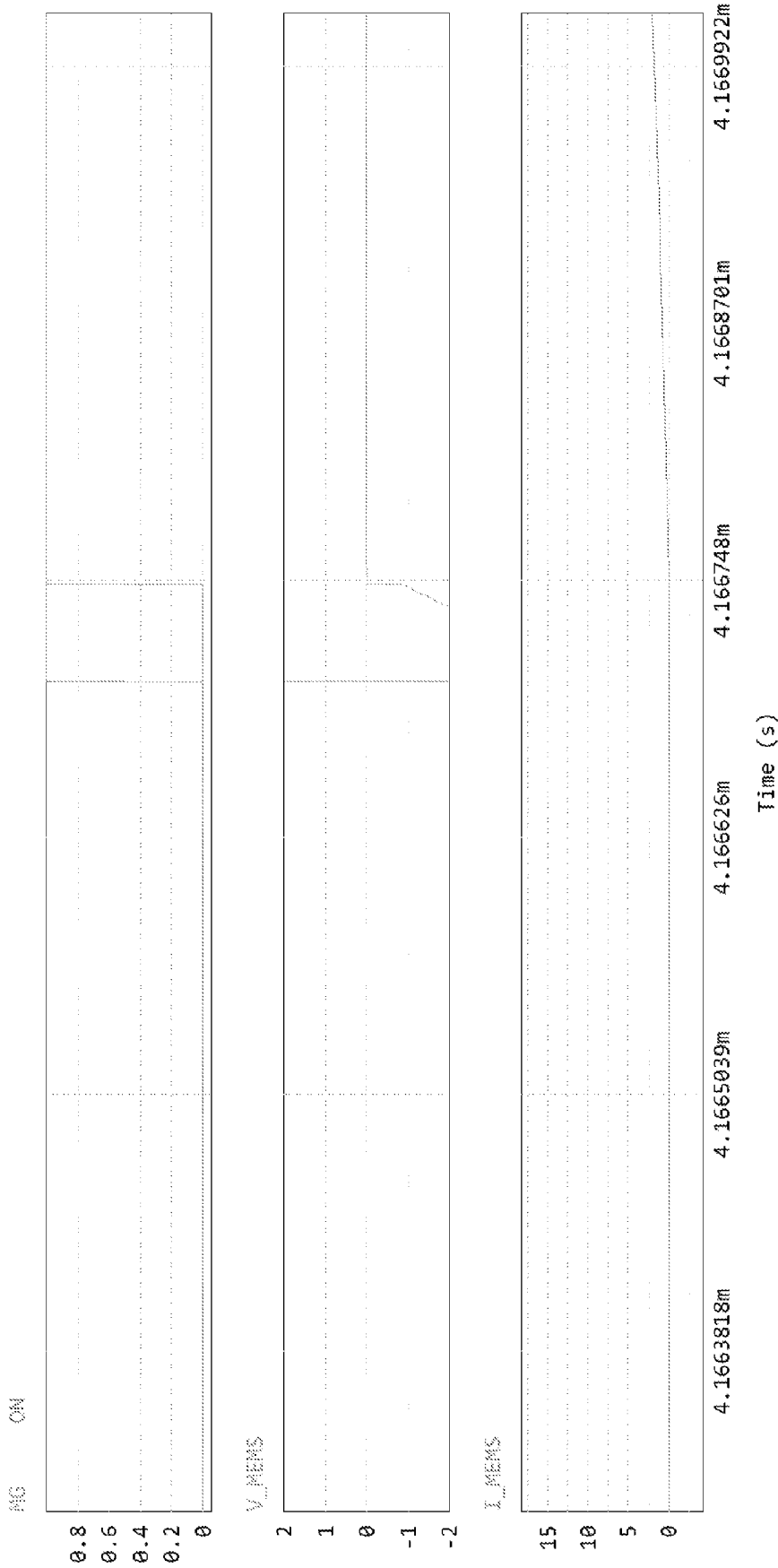
Figure 17:
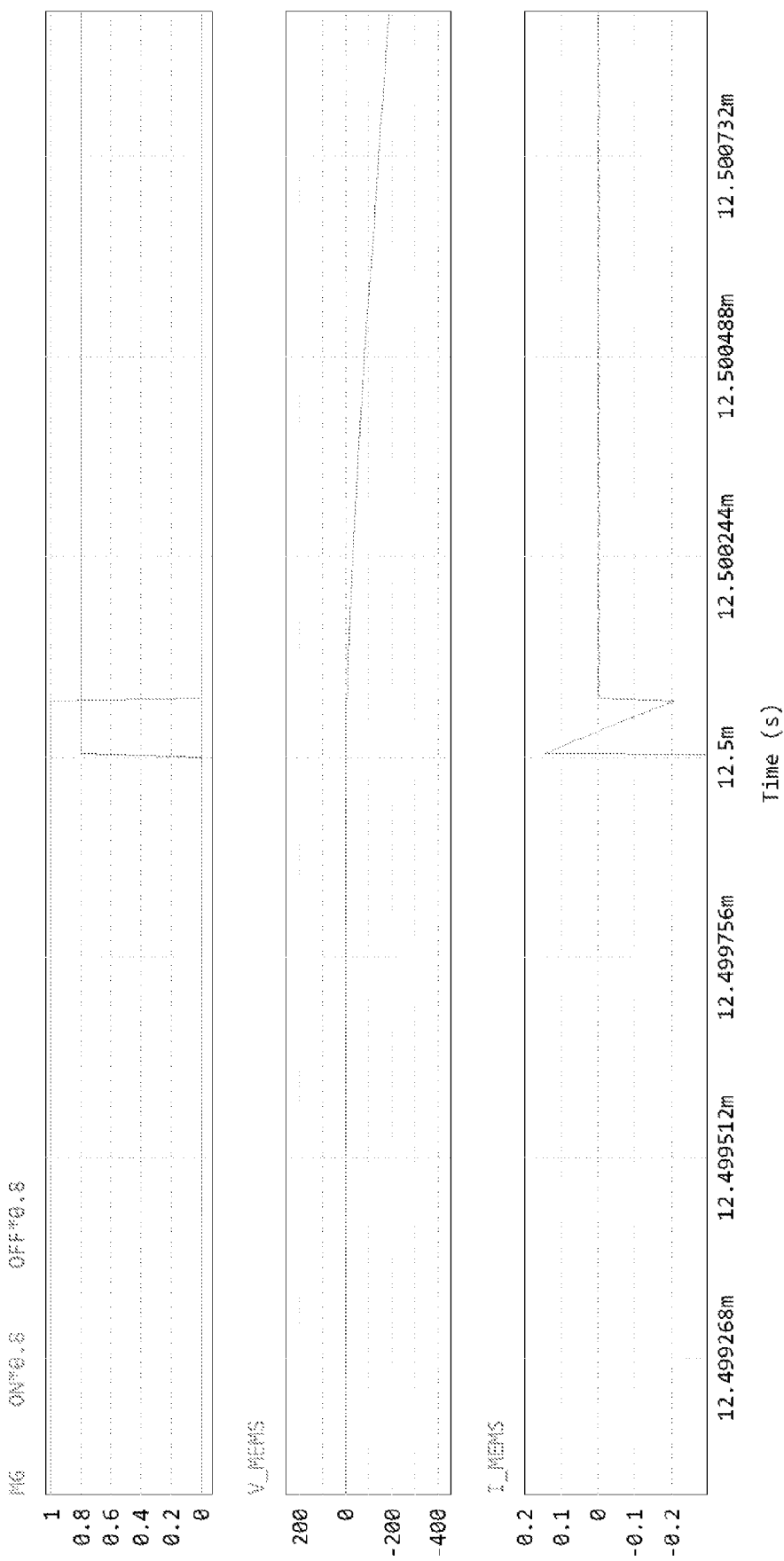

Referring to FIGS. 15-17, the parameters of a system operating with an AC voltage having a peak voltage of 200V and a peak current of 10 A are schematically illustrated. Referring to FIG. 16, the current flows and MEMS voltages during the ON transition are shown. Referring to FIG. 17, the current flows and MEMS voltages during the OFF transition are shown.

Figures 18, 19:
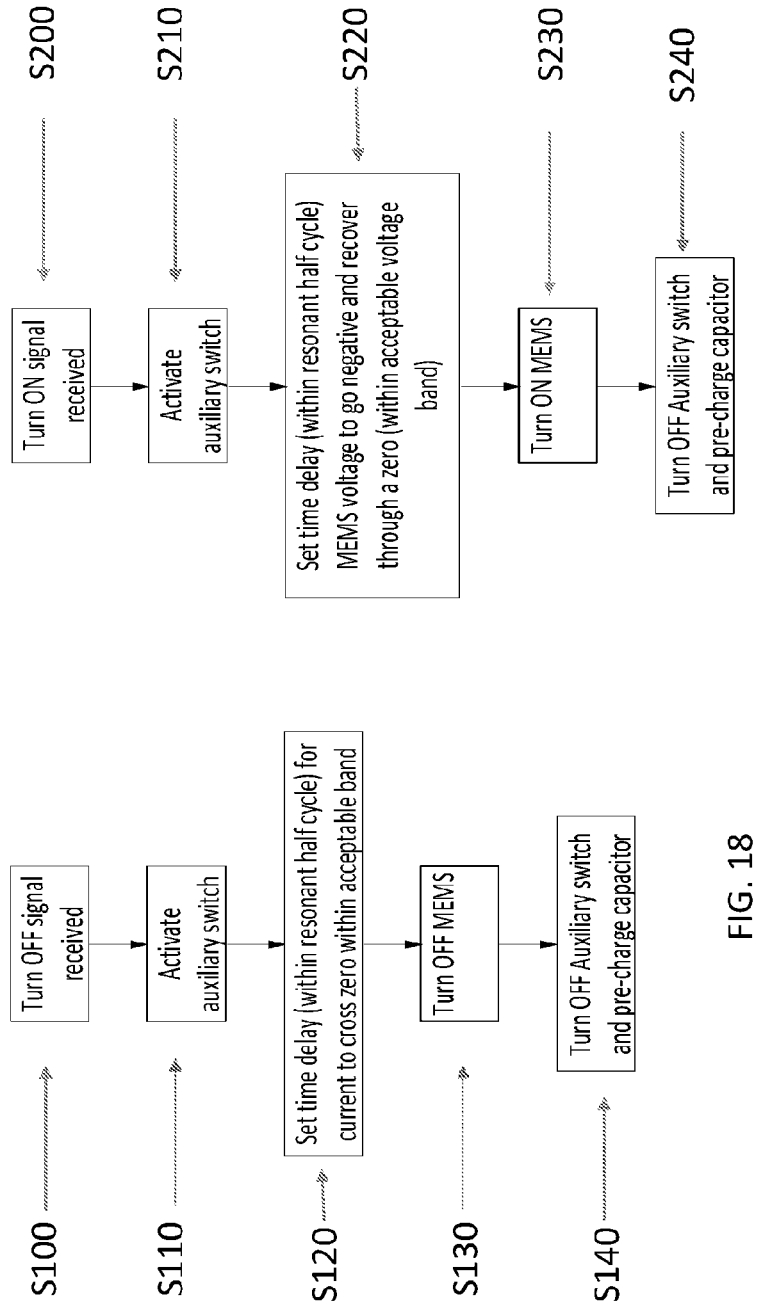
FIG. 18 schematically illustrates a method of protecting a MEMS relay switch system in a turn OFF operation.
FIG. 19 schematically illustrates a method of protecting a MEMS relay switch system in a turn ON operation.

Referring to FIG. 18, a method according to one example includes in S100 receiving a turn OFF signal. The method proceeds to S110 where the auxiliary switch is activated. In S120 a time delay is set within the resonant half cycle of the pulse parallel resonant circuit. In S130, the MEMS relay switch system is turned OFF. The method concludes in S140 with the auxiliary switch being turned OFF and the capacitor being pre-charged.

Referring to FIG. 19, a method according to one example includes in S200 receiving a turn ON signal. In S210 the auxiliary switch is activated. The method proceeds to S220 in which a time delay is set within the resonant half cycle of the pulse parallel resonant circuit. The voltage of the MEMS relay switch system goes negative and recovers through a zero point within an acceptable voltage band. The method proceeds to S230 where the MEMS relay switch system is turned ON. The method concludes in S240 with the bidirectional auxiliary switch being turned OFF and the capacitor being pre-charged.

According to another example, a method may include receiving a signal. The method may also include activating an auxiliary switch. The method may further include determining if the received signal is a turn OFF or a turn ON signal. The method may further include, in the receipt of a turn OFF signal, setting a time delay within a resonant half cycle of a parallel resonant pulse circuit for current to cross zero within an acceptable band and turning off a MEMS relay switch system. The method may even further include, in the receipt of a turn ON signal, setting a time delay within the resonant half cycle of the parallel resonant pulse circuit for the voltage of MEMS relay switch system to go negative and recover through a zero voltage within an acceptable voltage band. The method may still further include turning off the auxiliary switch and pre-charging a capacitor of the parallel resonant pulse circuit.

This written description uses examples to disclose the embodiments, including the best mode, and to enable a person of ordinary skill in the art to practice the claimed inventions, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system for protecting a MEMS relay switch system that controls electric current to a load, the system comprising:
    a parallel resonant circuit in series with the MEMS relay switch system, the parallel resonant circuit comprising an auxiliary switch in series with a capacitor configured to be pre-charged by a voltage source, and an inductor in parallel with the auxiliary switch and the capacitor, wherein the inductor is in series with the MEMS relay switch system.

2. The system according to claim 1, further comprising a bypass switch in parallel with the parallel resonant circuit.

3. The system according to claim 2, wherein the bypass switch comprises a second auxiliary switch.

4. The system according to claim 1, wherein the capacitor is configured to be charged to a voltage that is higher than the voltage source.

5. The system according to claim 4, wherein the capacitor is configured to be charged to a voltage that is 10% to 30% higher than the voltage source.

6. The system according to claim 1, wherein the auxiliary switch comprises at least one solid-state switch in series with a diode.

7. The system according to claim 6, wherein the auxiliary switch comprises a four quadrant switch combination that conducts current in both directions and blocks voltages in both directions.

8. The system according to claim 1, wherein the auxiliary switch comprises switches in back-to-back configuration or two thyristors in anti-parallel configuration.

9. The system according to claim 1, wherein the voltage source is an AC voltage source and the capacitor is configured to be charged to a voltage at least equal to a peak voltage of the AC voltage source.

10. The system according to claim 9, wherein the capacitor is configured to be charged to a voltage higher than the peak voltage of the AC voltage source.

11. A method for protecting a MEMS relay switch system that controls electric current to a load, the method comprising:
receiving a turn OFF signal;
activating an auxiliary switch of a parallel resonant circuit in series with the load, the parallel resonant circuit comprising the auxiliary switch in series with a capacitor configured to be pre-charged by a voltage source, and an inductor in parallel with the auxiliary switch and the capacitor, the inductor being in series with the load;
setting a time delay within a resonant half cycle of the parallel resonant circuit for the electric current to cross zero within a predefined electric current band;
turning OFF the MEMS relay switch system; and
turning OFF the auxiliary switch.

12. The method according to claim 11, further comprising:
pre-charging the capacitor after turning OFF the auxiliary bidirectional switch.

13. The method according to claim 12, wherein pre-charging the capacitor comprises pre-charging the capacitor to a voltage that is higher than a voltage of the voltage source.

14. The method according to claim 12, wherein the voltage source is an AC voltage source and pre-charging the capacitor comprises pre-charging the capacitor to a voltage equal to or higher than a peak voltage of the AC voltage source with the same polarity as the AC voltage source.

15. The method according to claim 11, further comprising:
turning ON a bypass switch in parallel with the parallel resonant circuit prior to receiving the turn OFF signal; and
turning OFF the bypass switch after turning OFF the auxiliary switch.

16. A method for protecting a MEMS relay switch system that controls electric current to a load, the method comprising:
receiving a turn ON signal;
activating an auxiliary switch of a parallel resonant circuit in series with the load, the parallel resonant circuit comprising the auxiliary switch in series with a capacitor configured to be pre-charged by a voltage source, and an inductor in parallel with the auxiliary switch and the capacitor, the inductor being in series with the load;
setting a time delay within a resonant half cycle of the parallel resonant circuit for a voltage of the MEMS relay switch system to go negative and recover through a zero voltage within a predefined voltage band;
turning ON the MEMS relay switch system; and
turning OFF the auxiliary switch.

17. The method according to claim 16, further comprising:
pre-charging the capacitor after turning ON the auxiliary switch.

18. The method according to claim 17, wherein pre-charging the capacitor comprises pre-charging the capacitor to a voltage that is higher than a voltage of the voltage.

19. The method according to claim 17, wherein the voltage source is an AC voltage source and pre-charging the capacitor comprises pre-charging the capacitor to a voltage equal to or higher than a peak voltage of the AC voltage source with the same polarity as the AC voltage source.

20. The method according to claim 16, further comprising:
turning ON a bypass switch in parallel with the parallel resonant circuit prior to receiving the turn ON signal; and
turning OFF the bypass switch after turning OFF the auxiliary switch.

* * * * *